(Model.)
G. B. ST. JOHN.
Plow.
No. 241,086.  Patented May 3, 1881.
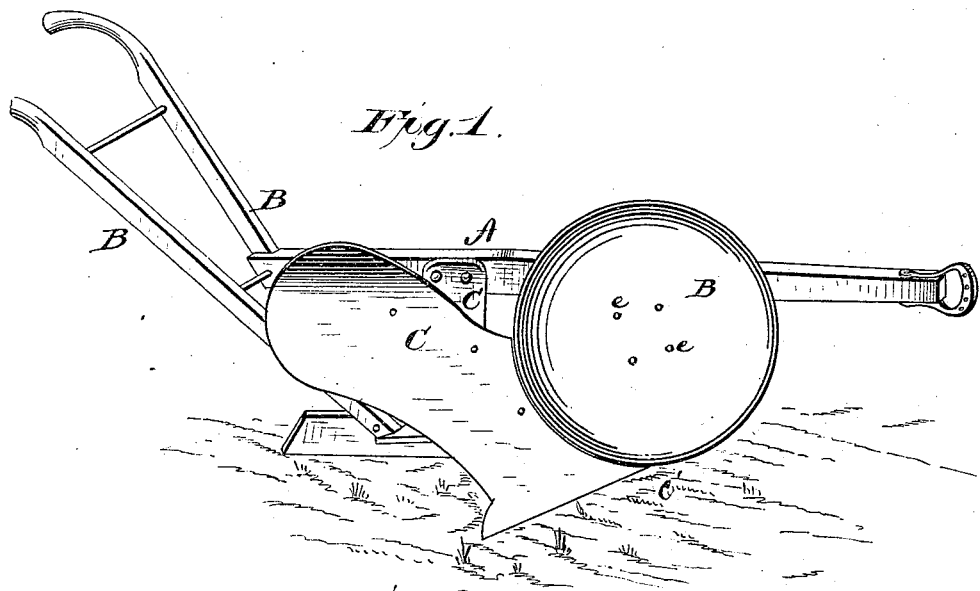
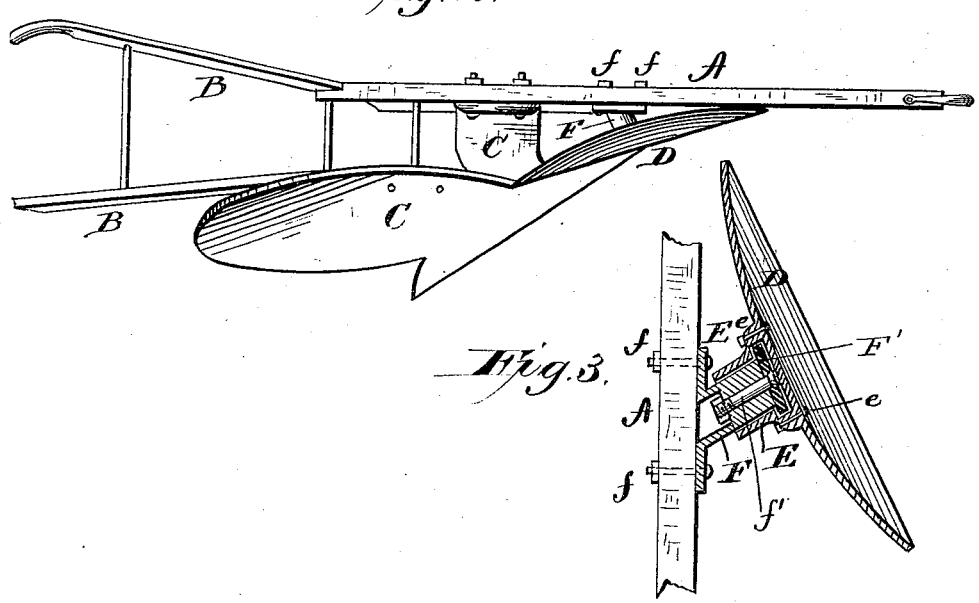
Witnesses,
Franck L. Ourand
George Cornell
Inventor,
Garland B. St John.
by L. Deane
his atty.
N. PETERS, Photo-Lithographer, Washington, D. C.

United States Patent Office.

GARLAND B. ST. JOHN, OF CEDAR RAPIDS, IOWA.

PLOW.

SPECIFICATION forming part of Letters Patent No. 241,086, dated May 3, 1881.

Application filed February 11, 1881. (Model.)

*To all whom it may concern:*

Be it known that I, GARLAND B. ST. JOHN, a citizen of Cedar Rapids, residing at Cedar Rapids, in the county of Linn and State of Iowa, have invented certain new and useful Improvements in Plows; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 is a side elevation of the plow as in use, showing in general the details of construction. Fig. 2 is a top plan of the plow. Fig. 3 is a detail, partly in plan and partly in section, showing how the revolving disk is secured to the plow-beam.

This invention is designed to provide a rotary cutting-edge in advance of the front point of the share and mold-board in such way and manner that the said edge shall cut into the hard ground, and thereby greatly lighten the work of the plow-point aforesaid, and shall also remove the stubble and prevent the plow from clogging. It also largely adds to the durability of the part of the plow which takes the greatest pressure, and, consequently, is subjected to the greatest wear.

In the accompanying drawings, A denotes the plow-beam, and B the handles.

C is the mold-board and half-share, which is secured by brace c to the beam, and may be of any desired shape or construction, the forward part of both being cut away at c' on a curved line conforming to the perimeter of the revolving disk D. This disk is of any desired and proper size, and at its center is secured by the sleeve E, to which it is fastened by bolts and nuts e upon the arm F by means of washers F', which are secured on the end of arm F by bolt and nut f', the arm F being, in turn, fixed to the plow-beam by bolts and nuts, f. The arm F is made and fitted to the beam so that when the said disk D is secured in position its line of revolution shall be at an angle with the plow-point.

This construction and consequent operation of the parts render the cut of the disk D more effectual and insure greater ease and certainty in the operation of the mold-board and half-share. The point of the mold-board and half-share will come nearly or quite under the center of the disk. Thus, while the disk is the first to strike and cut the ground, its office is merely to prepare the way for the plow-point, while at the same time the plow-point is at the most convenient position to take the ground in the line of cut made by the said disk, and as soon as it is made. The invention, as above explained, shows its application to a walking-plow, but if attached to a truck the handles can be dispensed with, and in any other way the mere details of the application may be changed to suit circumstances.

It will be readily seen that by the use of this disk the ordinary rolling colter may be dispensed with, as it accomplishes the work heretofore performed by it.

I am aware that colters have been made dish-shaped and set angling to the line of draft in front of an ordinary plow for the purpose of turning a small furrow, covering the weeds and stubble in such manner that the plow following puts them out of sight. It will be seen that this invention differs widely from those devices in the nature and manner of the work it is to perform.

The dished rolling colter working in advance of the ordinary plow meets a cutting resistance for nearly one-half its circumference, while the plow following cuts the width of share at the bottom of the furrow, thus tending to increase rather than lighten the draft of the plow to which it is attached.

It will be seen that with this device the whole furrow is moved a part of the way, while the half-share and mold-board, being formed to receive the furrow from the disk, has only the remaining work to perform. The forward half of the furrow being handled by the disk, only one-fourth of its circumference meeting the resistance while cutting, and the half-share having only the remaining half to cut at the bottom of the furrow, the whole together, as heretofore described, greatly reduces the draft of this plow over any heretofore known.

Having thus described my invention, what I claim as new, and wish to secure by Letters Patent, is—

1. In a plow, the half-share and mold-board C, cut away at c' in front on a curved line, its forward end or point extending about to the center of the disk C, and combined with said disk, which is mounted by sleeve E on the inclined arm F, extending from the plow-beam, substantially in the manner and for the purposes set forth.

2. In a plow, the combination of the revolving concavo-convex disk with the half-share and mold-board arranged to work in unison, said disk cutting in advance of the mold-board, substantially as described.

In testimony whereof I affix my signature in presence of two witnesses.

GARLAND B. ST. JOHN.

Witnesses:
ED. L. ELY,
H. J. ST. JOHN.